United States Patent [19]

Winkler et al.

[11] 3,829,875

[45] Aug. 13, 1974

[54] PHOTOGRAPHIC CAMERA FOR USE WITH ROLL FILM

[75] Inventors: Alfred Winkler, Munich; Dieter Engelsmann, Unterhaching; Horst Karl, Munich; Rolf Schroeder, Baldham, all of Germany

[73] Assignee: AGFA-Gevaert Aktiengesellschaft, Leverkusen, Germany

[22] Filed: Nov. 26, 1973

[21] Appl. No.: 418,854

[30] Foreign Application Priority Data
Nov. 24, 1972 Germany............................ 2257683

[52] U.S. Cl.................. 354/206, 354/204, 354/212
[51] Int. Cl........................ G03b 17/42, G03b 1/16
[58] Field of Search ......... 95/31 FM, 31 FL, 31 AC

[56] References Cited
UNITED STATES PATENTS

| 2,307,748 | 1/1943 | Philips............................. 95/31 FL |
| 3,621,770 | 4/1969 | Tsuruoka......................... 95/31 FL |
| 3,641,897 | 2/1972 | Fujimoto.......................... 95/31 AC |
| 3,645,182 | 2/1972 | Kimura............................ 95/31 AC |

FOREIGN PATENTS OR APPLICATIONS

| 747,615 | 4/1956 | Great Britain ................... 95/31 AC |

*Primary Examiner*—Robert P. Greiner
*Attorney, Agent, or Firm*—Michael S. Striker

[57] ABSTRACT

A still camera for use with roll film having a row of perforations, one for each film frame, employs a planetary transmission whose planet carrier is rotatable by hand, whose internal gear rotates the takeup reel during transport of film, and whose sun gear can cock the shutter or perform another function while the internal gear is held against rotation. The sun gear is held against rotation by a lever during a first stage of rotation of the planet carrier while the internal gear rotates the takeup reel. A feeler scans the moving film and penetrates into an oncoming perforation to thereby disengage the lever from the sun gear so that the latter can rotate during a second stage of rotation of the planet carrier as soon as the internal gear is arrested due to resistance of the takeup reel to rotate in a direction to collect exposed film. The lever has a tooth which engages complementary teeth of the sun gear during the first stage of rotation of the planet carrier; such teeth constitute an overload clutch which allows the sun gear to rotate against the opposition of the lever in response to rotation of the planet carrier when the latter transmits a predetermined force while the internal gear is also held against rotation. This prevents a tearing of the film and/or damage to component parts of the camera.

10 Claims, 2 Drawing Figures

PHOTOGRAPHIC CAMERA FOR USE WITH ROLL FILM

CROSS-REFERENCE TO RELATED APPLICATIONS

The photographic apparatus of the present invention constitutes an improvement over and a further development of photographic apparatus which is disclosed in our copending application Ser. No. 396,455 filed Sept. 12, 1973. The photographic apparatus of Ser. No. 396,455 constitutes an improvement over and a further development of photographic apparatus which are disclosed in the commonly owned copending application Ser. No. 314,277 filed by Gunter Fauth on Dec. 11, 1972 for "Film transporting mechanism for still cameras."

BACKGROUND OF THE INVENTION

The present invention relates to photographic apparatus in general, especially to still cameras, and more particularly to improvements in photographic apparatus of the type wherein the input member of a transmission drives a first output member during one stage of its movement to thereby transport the film, and wherein the input member drives a second output member during a second stage of its movement whereby the second output member cocks the shutter and/or performs another function prior to the making of an exposure.

The aforementioned copending application Ser. No. 314,277 of Fauth discloses a camera wherein the input member of the tranmission constitutes the sun gear or the planet carrier of a planetary transmission and the internal gear of the transmission rotates the takeup reel during a first stage of movement of the input member from a starting position to an end position. A second output member of the transmission is held against rotation while the input member drives the internal gear but the second output member is free to cock the shutter as soon as the transport of film by the length of a frame is completed. The film has a row of perforations, one for each film frame, and is scanned by a feeler which penetrates into an oncoming perforation while the takeup reel receives torque from the internal gear whereby the feeler initiates the disengagement of a locking member from the second output member so that the shutter can be cocked only when the takeup reel is idle or vice versa.

The transmission in the camera of Fauth operates satisfactorily as long as the takeup reel is free to rotate while the input member moves the first output member and as long as the second output member is free to rotate when the transport of film by the length of a frame is completed. However, if the lengthwise movement of film is blocked prior to placing of the foremost unexposed film frame into full register with the picture taking lens, or if the locking member is not disengaged from the second output member not later than when the transport of film by the length of a frame is completed, further movement of the input member to a predetermined position is likely to result in damage to film, especially in the region of perforations, and/or in damage to and/or partial or complete destruction of the transmission and/or other components of the camera. For example, the film can be completely unwound from the supply reel before the feeler penetrates into the oncoming perforation, i.e., that the last full film frame is followed by an incomplete film frame; the clamping device which attaches the trailing end of the film to the core of the supply reel then prevents any further lengthwise movement of the film before the locking member is disengaged from the second output member. If the user of the camera continues to move the output member to the end position, the trailing end of the film is likely to be forcibly separated from the core of the supply reel, the film can break or tear somewhere between the cores of the supply and takeup reels, or the parts of the film transporting mechanism and/or shutter cocking mechanism are liekly to be damaged beyond repair.

Our copending application Ser. No. 396,455 discloses a photographic apparatus wherein an overload clutch is interposed between the input member and the second output member to allow the input member to rotate relative to the second output member while the two output members are held against rotation but the user continues to move the input member. Such overlaod clutch (e.g., a spring friction clutch) constitutes a discrete component part of the camera and must be installed and adjusted with a relatively high degree of accuracy in order to insure that the input member can move relative to the two output members while the output members offer a predetermined resistance to movement. The provision of the just discussed discrete overload clutch contributes to the cost of the photographic apparatus.

SUMMARY OF THE INVENTION

An object of the invention is to provide a photographica apparatus, especially a still camera, wherein the input member of a transmission can drive alternately two output members during different stages of its movement from a first to a second position, wherein the input member can complete its movement to second position even if both output members resist a movement in response to movement of the input member, and wherein such movability of the input member to second position irrespective of whether or not the output members are free to move during the respective stages of movement of the input member can be achieved without resorting to a discrete overload clutch.

Another object of the invention is to provide a photographic apparatus of the just outlined character wherein the parts which perform certain predetermined functions can also perform the additional function of allowing the input member to complete its movement from a first to a second position even if both output members are blocked so that the apparatus is not damaged and cannot damage the film even though it does not embody a discrete overload clutch which is necessary in the apparatus of the copending application Ser. No. 396,455.

A further object of the invention is to provide a novel and improved planetary transmission for use in the above outlined photographic apparatus.

The invention is embodied in a photographic apparatus for use with roll film which is collected by a rotary takeup member during forward transport to place successive unexposed film frames into a position for exposure to scene light. The apparatus comprises a transmission including input means (e.g., the planet carrier of a planetary transmission) which is movable from a first to a second position, first output means (e.g., the internal gear of the transmission) which is arranged to rotate the takeup member and normally receives motion from the input means during one stage (e.g., a first stage) of movement of the input means from the first to the second position, and second output means (e.g., the sun gear of the transmission) which normally receives motion from the input means during another (e.g., second) stage of movement of input means from the first to the second position. The apparatus further comprises locking means which is movable between an operative position in which the second output means is normally held against movement and an inoperative position in which the second output means is free to move in response to movement of the input means, means for normally moving the locking means to the inoperative position in response to composition of film transport by the length of a frame, and overload clutch means which is provided between the locking means and the second output means to permit the second output means to move relative to the locking means in the operative position of the locking means in response to transmission of a predetermined force from the input means to the second output means.

In accordance with a presently preferred embodiment of the invention, the overload clutch means includes elements which constitute component parts of the second output means and locking means so that the locking means and the second output means can perform their normal functions plus the function of preventing a tearing of film and/or damage to camera parts when the two output means are held against movement while the input means moves between its first and second positions. The locking means may comprise a lever which is pivotable between the operative and inoperative positions and has a pallet or tooth which cooperates with teeth on the second output means to form therewith the aforementioned overload clutch which allows the second output means to move relative to the lever if the first output means is held against movement, if the lever assumes its operative position, and if the input means transmits the aforementioned predetermined force which, in the absence of the overload clutch means, could result in breaking of film and/or damage to or total destruction of the photographic apparatus.

The inclination of flanks on the teeth of the lever and second output means can be readily selected in such a way that these teeth normally prevent any movement of the second output means while the lever assumes its operative position but that the teeth of the second output means ride over the tooth of the lever when the input means moves toward its second position while the two output means are blocked.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
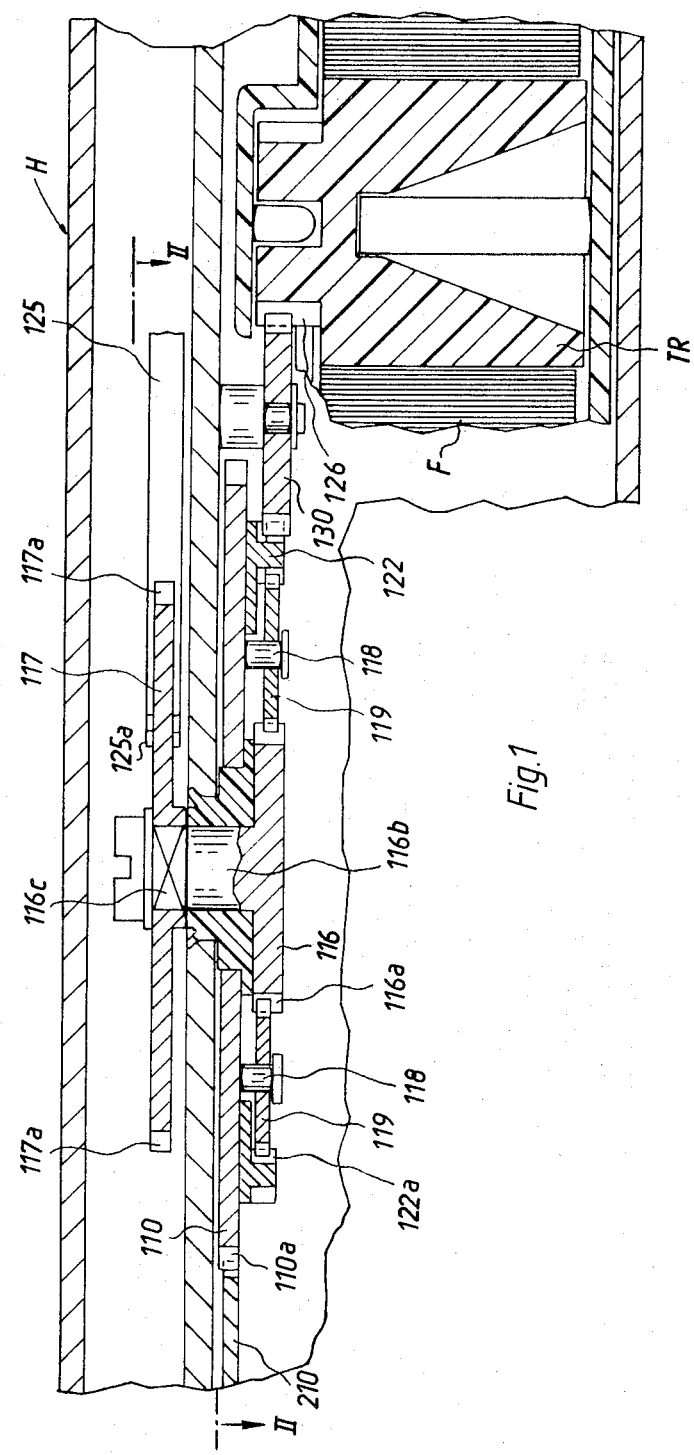
FIG. 1 is an enlarged fragmentary vertical sectional view of a still camera which embodies the invention.

Referring to the drawing in detail, there is shown a portion of a still camera which comprises a housing H having a slot through which extends outwardly a portion of a wheel 110 constituting a manually operable component of the film transporting mechanism and the input means of a planetary transmission. The wheel 110 is the carrier of the planetary transmission and is provided with three shafts 118 for planet pinions 119 meshing with the teeth 122a of a ring gear or internal gear 122 and with the teeth 116a of a spur gear 116. The teeth 110a of the wheel 110 can be engaged by a blocking pawl 210 which insures that the wheel 110 can rotate in a single direction, i.e., in a direction to draw the film F from a supply reel (not shown) and to advance the film toward a takeup reel TR. The teeth 110a further enable the operator to conveniently rotate the wheel 110 in the single direction. The aforementioned slot in the housing H is preferably adjacent to one corner of the housing.

The spur gear 116 is coaxial with the wheel 110 and its shaft 116b has a polygonal portion 116c surrounded by a complementary surface in a gear 117 so that the gears 116, 117 invariably rotate as a unit. These gears consitute the sun gear and the second of two output means of the planetary transmission. The first output means is the ring gear 122. The teeth 117a of the gear 117 can be engaged by the pallet or tooth 125a of a locking lever 125 which is pivotable in the housing H, as at 125b, and is biased against the gear 117 by a helical spring 125c.

Figure 2:
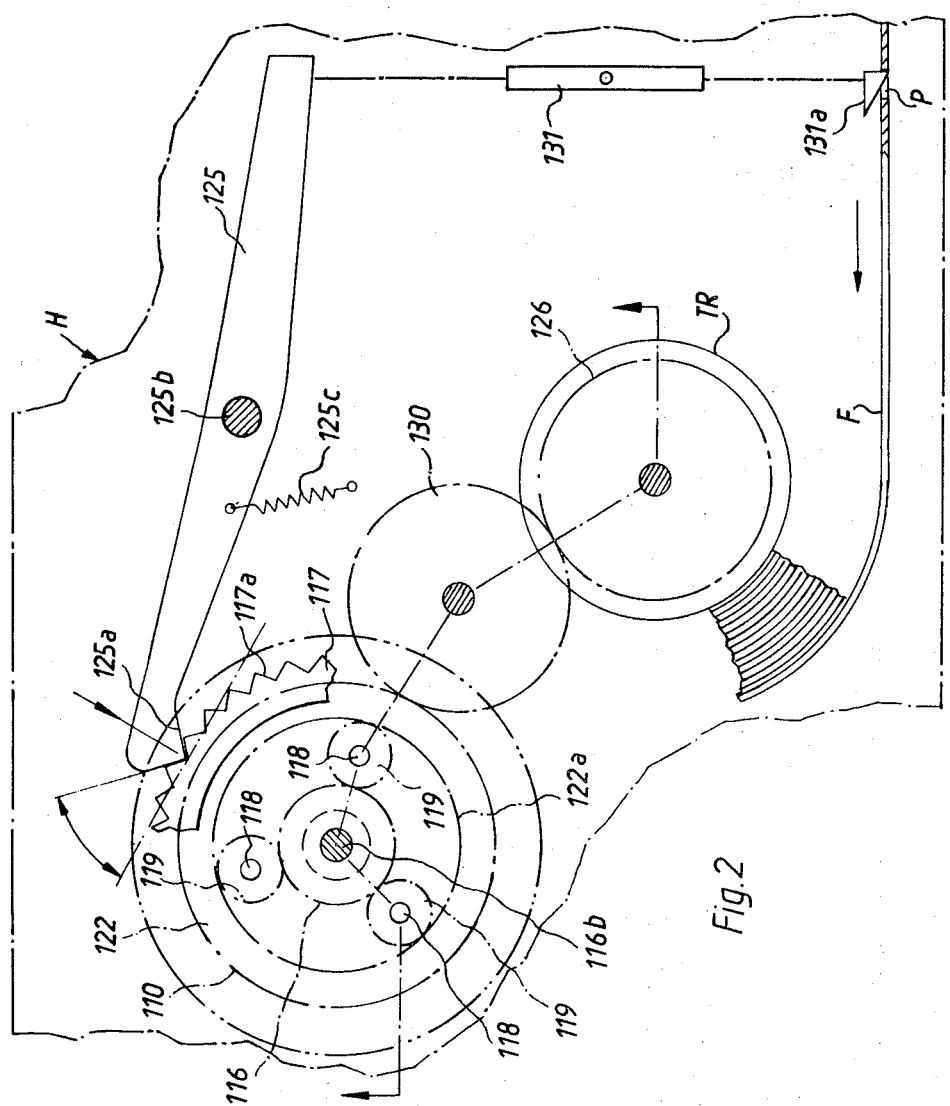
FIG. 2 is a smaller-scale sectional view as seen in the direction of arrows from the line II—II of FIG. 1.

The internal gear 122 meshes with an intermediate gear 130 which in turn meshes with a gear 126 on the takeup reel TR for convoluted exposed film F. The locking lever 125 is movable by a feeler 131 having a scanning arm 131a which tracks the perforations P in film F and insures that the lever 125 holds the gear 117 against rotation as long as the portion 131a does not penetrate into an oncoming perforation P. The perforations P are distributed in the film F in such a way that the distance between the centers of two neighboring perforations corresponds to the distance between the centers of two neighboring film frames. When the scanning arm 131a penetrates into the oncoming perforation P (i.e., while the film F is being transported in response to rotation of the wheel 110), the feeler 131 causes the locking lever 125 to become disengaged from the gear 117 (i.e., to move from the operative position of FIG. 2 to an inoperative position) so that the sun gear including the gears 116, 117 is free to rotate. The scanning arm 131a is automatically retracted from the adjacent perforation P when the operator actuates the camera release so that the film F can be transported again upon completion of an exposure. The transport of film F by the length of a frame is terminated not by preventing further rotation of the wheel 110 but rather by permitting the gears 116, 117 to rotate in response to penetration of the scanning arm 131a into the oncoming perforation P of the film F. When the gears 116, 117 are free to rotate, the gear 122 is brought to a standstill by tension of the film F which is convoluted on the core of the takeup reel TR, i.e., the gears 126, 130, 122 then offer greater resistance to rotation in response to rotation of planet pinions 119 than the sun gear 116. The fact that the gears 122, 130, 126 cease to rotate when the tooth 125a of the locking lever 125 is disengaged from the teeth 117a of the gear 117 is further attributed to friction between the teeth of the gears 126, 130, 122.

The gears 116, 117 may constitute a one-piece sun gear. Such integration of the gears 116, 117 into a one-piece cluster is desirable and satisfactory as long as the film F is free to move lengthwise until the scanning arm 131a penetrates into the oncoming perforation P. However, the film F is not always advanced by the length of a frame, for example, due to the provision of a clamp or the like which prevents the trailing end of the film F from becoming detached from the core of the supply reel, not shown. In accordance with a previously known proposal which is disclosed in Ser. No. 314,277, the sun gear remains blocked as long as the locking lever engages the sun gear, and the internal gear also remains blocked when the film cannot advance by the length of a full frame. If the operator continues to attempt to rotate the wheel, this can cause serious damage to the parts of the camera and/or a tearing of the film, depending upon whether the breakage occurs before or simultaneously with tearing of film or whether the film tears before the parts of the camera break. The aforementioned copending application Ser. No. 396,455 offer a solution of the just discussed problem by providing a discrete overload clutch.

In accordance with the present invention, a tearing of film F and/or breakage of the parts is avoided in the following manner: The teeth 117a of the gear 117 and the tooth 125a of the locking lever 125 are configurated in such a way that the gears 116, 117 can be rotated by wheel 110 even if the scanning arm 131a fails to enter a perforation P. Thus, the tooth 125a then rides over the adjacent tooth or teeth 117a and allows the gear 117 to rotate with the gear 116 in response to rotation of the wheel 110 before the scanning arm 131a enters the oncoming perforation P. In this way, a tearing of the film F is effectively prevented and the parts of the camera are not likely to break even if the user continues to rotate the wheel 110 while the film F cannot move lengthwise. The configuration of the tooth 125a and the inclination of the flanks of teeth 117a can be readily calculated with a view to insure that the gear 117 will rotate and that the tooth 125a will ride over the adjacent teeth 117a when the wheel 110 transmits to the gear 116 a predetermined force via planet pinions 119. Reference may be had to the German-language book entitled "Bauelemente der Feinmechanik" by Richter and Voss, published in 1952 by Technik, Berlin, Germany.

An advantage of the just discussed configuration of tooth 125a and teeth 117a is that the camera can operate properly without resorting to a discrete overload clutch of the type disclosed in our copending application Ser. No. 396,455. The elements of the overload clutch 117a, 125a of the camera of our invention constitute component parts of the sun gear 116, 117 and locking lever 125. This clutch insures that the wheel 110 can be invariably rotated from a first to a second position even if the internal gear 122 is blocked while the locking lever 125 assumes the operative position of FIG. 2, i.e., while the scanning arm 131a of the feeler 131 bears against the film F but does not extend into a perforation P.

Without further analysis, the foregoing will so fully reveal the gist of the present invention that others can, by applying current knowledge, readily adapt it for various applications wthout omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus for use with roll film which is collected by a rotary takeup member during forward transport to place successive unexposed film frames into a position for exposure to scene light, a combination comprising a transmission including input means movable from a first to a second position, first output means arranged to rotate said takeup member and normally receiving motion during one stage of movement of said input means from said first to said second position, and second output means normally receiving motion from said input means during another stage of movement of said input means from said first to said second position; locking means movable between an operative position in which said second output means is held against movement and an inoperative position in which said second output means is free to move during said other stage of movement of said input means; means for normally moving said locking means to said inoperative position in response to completion of film transport by the length of a frame; and overload clutch means provided between said locking means and said second output means to permit said second output means to move relative to said locking means in the operative position of said locking means in response to transmission of a predetermined force from said input means to said second output means.

2. A combination as defined in claim 1, wherein said clutch means comprises first and second teeth respectively provided on said locking means and said second output means and being in mesh in said operative position of said locking means.

3. A combination as defined in claim 2, wherein said locking means comprises a lever which is pivotable between said operative and inoperative positions thereof.

4. A combination as defined in claim 2, further comprising means for biasing said locking means to said operative position and said predetermined force suffices to disengage said first from second teeth while said first output means is held against movement and said input means performs said other stage of movement from said first to said second position.

5. A combination as defined in claim 1, wherein said transmission is a planetary transmission having a sun gear which constitutes said second output means, an internal gear which constitutes said first output means, a planet carrier constituting said input means, and at least one planet pinion rotatably mounted on said planet carrier and meshing with said gears.

6. A combination as defined in claim 1, wherein said roll film has a row of perforations, one for each film frame, and said means for moving said locking means comprises a feeler having a scanning portion arranged to track the roll film and to penetrate into an oncoming perforation to thereby effect a movement of said locking means to said inoperative position.

7. A combination as defined in claim 1, wherein said input means is rotatable between said positions thereof and further comprising blocking means for confining said input means to rotation in a single direction.

8. A combination as defined in claim 7, wherein said first and second output means are respectively rotatable during said one and said other stage of movement of said input means and are coaxial with said input means.

9. A combination as defined in claim 1, wherein said input means comprises a portion which is accessible to the hand of the user of said apparatus so that the user can move said input means between said positions.

10. A combination as defined in claim 1, wherein said overload clutch means includes elements which constitute integral parts of said locking means and said second output means.

* * * * *